United States Patent
Barboni et al.

(10) Patent No.: US 9,824,551 B2
(45) Date of Patent: Nov. 21, 2017

(54) IDENTIFYING A SEAT POSITION WITH INFRARED LIGHT

(71) Applicant: International Business Machines Corporation, Armonk, NY (US)

(72) Inventors: Gabriele Barboni, Rome (IT); Alessandro Baroni, Pratola Peligna (IT); Emilio Spatola, Salerno (IT); Marta Usai, Villacidro (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/051,691

(22) Filed: Feb. 24, 2016

(65) Prior Publication Data
US 2017/0243449 A1    Aug. 24, 2017

(51) Int. Cl.
G08B 1/08    (2006.01)
G08B 5/36    (2006.01)

(52) U.S. Cl.
CPC ..................... *G08B 5/36* (2013.01)

(58) Field of Classification Search
CPC combination set(s) only.
See application file for complete search history.

(56) References Cited

U.S. PATENT DOCUMENTS

| | | | |
|---|---|---|---|
| 6,140,921 A | 10/2000 | Baron et al. | |
| 6,578,795 B2 * | 6/2003 | Romca | B64D 11/00 |
| | | | 116/209 |
| 7,178,954 B2 * | 2/2007 | Blechschmidt | B60Q 3/46 |
| | | | 244/118.5 |
| 7,315,037 B1 | 1/2008 | Page et al. | |
| 8,587,446 B2 * | 11/2013 | Hefferon | G08B 5/221 |
| | | | 297/217.3 |
| 8,896,456 B2 * | 11/2014 | Curtis | G08B 5/00 |
| | | | 340/667 |
| 9,467,809 B2 * | 10/2016 | Lopez | H04W 4/023 |
| 2007/0001124 A1 * | 1/2007 | Moreno Sobrino | A47C 1/13 |
| | | | 250/484.4 |
| 2011/0050442 A1 * | 3/2011 | Hefferon | G08B 5/221 |
| | | | 340/679 |
| 2012/0128330 A1 | 5/2012 | Mahdavi et al. | |

(Continued)

FOREIGN PATENT DOCUMENTS

CN    202303016 U    7/2012
CN    103479113 A    1/2014
(Continued)

OTHER PUBLICATIONS

Aquino, Judith, "Million-Dollar Idea: An App That Tells You Which Seats Are Still Empty in a Dark Theater", Business Insider, Jan. 28, 2011, 11:16 am, 2 pages.

(Continued)

*Primary Examiner* — Travis Hunnings
(74) *Attorney, Agent, or Firm* — David B. Woycechowsky

(57) ABSTRACT

A seating area system for use in a seating area where the seats have respectively associated radiation emitting devices (for example, infrared light emitting diodes) to help people find their seats through a camera type display on their mobile devices. Upon request from an end user, a server system turns on the radiation emitting device, associated with the end user's request, for a limited time.

17 Claims, 6 Drawing Sheets

(56) References Cited

U.S. PATENT DOCUMENTS

2012/0242492 A1    9/2012  Grunfeld
2013/0308939 A1    11/2013 Armentrout et al.
2015/0382144 A1*   12/2015 Lopez .................. H04W 4/023
                                               455/456.2

FOREIGN PATENT DOCUMENTS

CN       203378771 U    1/2014
CN       203506077 U    4/2014

OTHER PUBLICATIONS

"Dilax Seat Management, Seat Occupancy Detection System", provided in search report dated Jun. 10, 2015, 2 pages.
"Novel method to locate the seat in a multi seating arrangement", An IP.com Prior Art Database Technical Disclosure, Authors et. al.: Disclosed Anonymously, IP.com No. 000201561, IP.com Electronic Publication: Nov. 15, 2010, 2 pages.

* cited by examiner

IDENTIFYING A SEAT POSITION WITH INFRARED LIGHT

BACKGROUND

It is a common experience that people arrive late at events, in particular events that happen in public locations such as cinemas, conference halls, concert halls or other places in which participants of such events need to find the their seat which may be a reserved, dedicated seats.

Latecomers walking between seats and aisles, may be considered, disruptive to concentration and inconvenient by other participants who arrived in time, and have taken their seats at the event or lecture. Furthermore, most of time, the environment of the seating area is dim, making it more difficult for the latecomers to remain discreet. A similar situation may happen in an airplane flying through a night zone with discreet lights on the floor to show the corridor and completely dimmed cabin lights. In a dim seating area, the dimness makes finding ones seat difficult.

SUMMARY

According to an aspect of the present invention, there is a method, computer program product and/or system that performs the following operations (not necessarily in the following order): providing a seating area with a plurality of seats including a first seat, and a plurality of radiation emitting devices respectively corresponding to the plurality of seats, the plurality of radiation emitting devices including a first radiation emitting device corresponding to the first seat; receiving, by a server over a communications network and from first user through a first portable wireless device, a request to activate the first radiation emitting device; responsive to the request, activating, by the server, the first radiation emitting device; and responsive to passage of a predetermined interval after the activation of the first radiation emitting device, deactivating the first radiation emitting device.

According to a further aspect of the present invention, there is a method, computer program product and/or system for use with a seating area with a plurality of seats including a first seat, and a plurality of radiation emitting devices respectively corresponding to the plurality of seats, the plurality of radiation emitting devices including a first radiation emitting device corresponding to the first seat. The method, computer program product and/or system perform the following operations (not necessarily in the following order: receiving, from a server and by a first portable wireless device including a camera and a display that displays images generated by the camera, a first machine readable identifier that correlates a first user associated with the first portable wireless device to the first seat of the plurality of seats; sending, to the server over a communications network and by a first user through a first portable wireless device, a request including the first machine readable identifier to cause the server to activate the radiation emitting device for a limited interval; and responsive to pointing the camera in a direction of the first seat during the limited interval, generating a series of time ordered images of a portion of the seating area on the display of the first portable wireless device, with at least some of the time ordered series of images showing the first radiation emitting device.

According to a further aspect of the present invention, there is a method, computer program product and/or system that performs the following operations: receiving from a server by a portable device, a machine readable identification data set including a first data pattern, assigned by the server to a target among a set of locations; sending to the server by the portable device, a request, including the machine readable identification data set, to trigger emission by the target of the first data pattern modulated into an infrared radiation signal for a limited period of time; receiving by the portable device, using an enabled infrared sensor hardware set connected within or with the portable device, a second data pattern modulated into an infrared radiation signal emitted by a location triggered also by the server; determining by the portable device that the received second data pattern modulated into an infrared radiation signal matches the first data pattern; and, generating by the portable device, a signal to advise the user of the portable device that the target has been identified in the field of view of the infrared sensor hardware set. In some embodiments operations further include repeating by the portable device, upon changing, by the user of the portable device, the position and the direction of the field of view of the portable device infrared sensor hardware set, the receiving, determining and generating steps until the target has been identified. In some of these embodiments operations further include the preliminary steps of assigning by the server, the user of the portable device to a target among the set of targets; and, sending by the server to the portable device a machine readable identification data set including a first data pattern. In some of these embodiments the server deciding at any time and independently of any request by the portable device, to trigger the target to emit the first data pattern modulated into an infrared radiation. In some of these embodiments the first or second data patterns is modulated into an infrared radiation signal emitted by a location infrared emitter turned on and off at intervals corresponding to the first data pattern. In some of these embodiments operations further include sending by the server, a request to a controller of the target infrared emitter to trigger the emitter for emitting the first data pattern modulated into an infrared radiation signal. In some of these embodiments the infrared sensor hardware set is in the form of a camera built into the portable device. In some of these embodiments operations further include displaying by the portable device, on the screen of the portable device, the frames captured by the enabled camera, the displayed frames including infrared lights corresponding to infrared radiations emitted by locations in the field of view of the camera. In some of these embodiments operations further include in the step of generating a signal on the portable device, computing by the portable device, the coordinates of the displayed infrared lights in the frames captured by the camera and superposing on the screen of the portable device, a first visual object indicative of the target, on the corresponding displayed infrared light. In some of these embodiments operations further include determining by the portable device that the received second data pattern does not match the first data pattern; and, computing by the portable device, the coordinates of the displayed infrared lights in the frames captured by the camera and superposing on the screen of the portable device, a second visual object indicative of one location infrared light which is not the target, on the corresponding displayed infrared light.

According to a further aspect of the present invention, there is a method, computer program product and/or system that performs the following operations: assigning the user of the portable device to a target among the set of targets; and, sending by the server to the portable device a machine readable identification data set including a first data pattern.

In some of these embodiments the computer implemented method further includes deciding at any time and independently of any request by the portable device, to trigger the target to emit the first data pattern modulated into an infrared radiation. In some of these embodiments the computer implemented method further includes sending a request to a controller of the target infrared emitter to trigger the emitter for emitting the first data pattern modulated into an infrared radiation signal.

BRIEF DESCRIPTION OF THE DRAWINGS

It should be noted that embodiments of the invention are described with reference to different types of subject matter. In particular, some embodiments are described with reference to method type claims whereas other embodiments have been described with reference to apparatus type claims. However, a person skilled in the art will understand that, unless otherwise notified, in addition to any combination of features belonging to one type of subject matter, may also be applicable to support claims directed to other types of subject matter.

The aspects defined above and further aspects of the present invention will be explained and discussed in terms of embodiments to be described hereinafter. These embodiments should not be considered as limiting.

Figure 1:
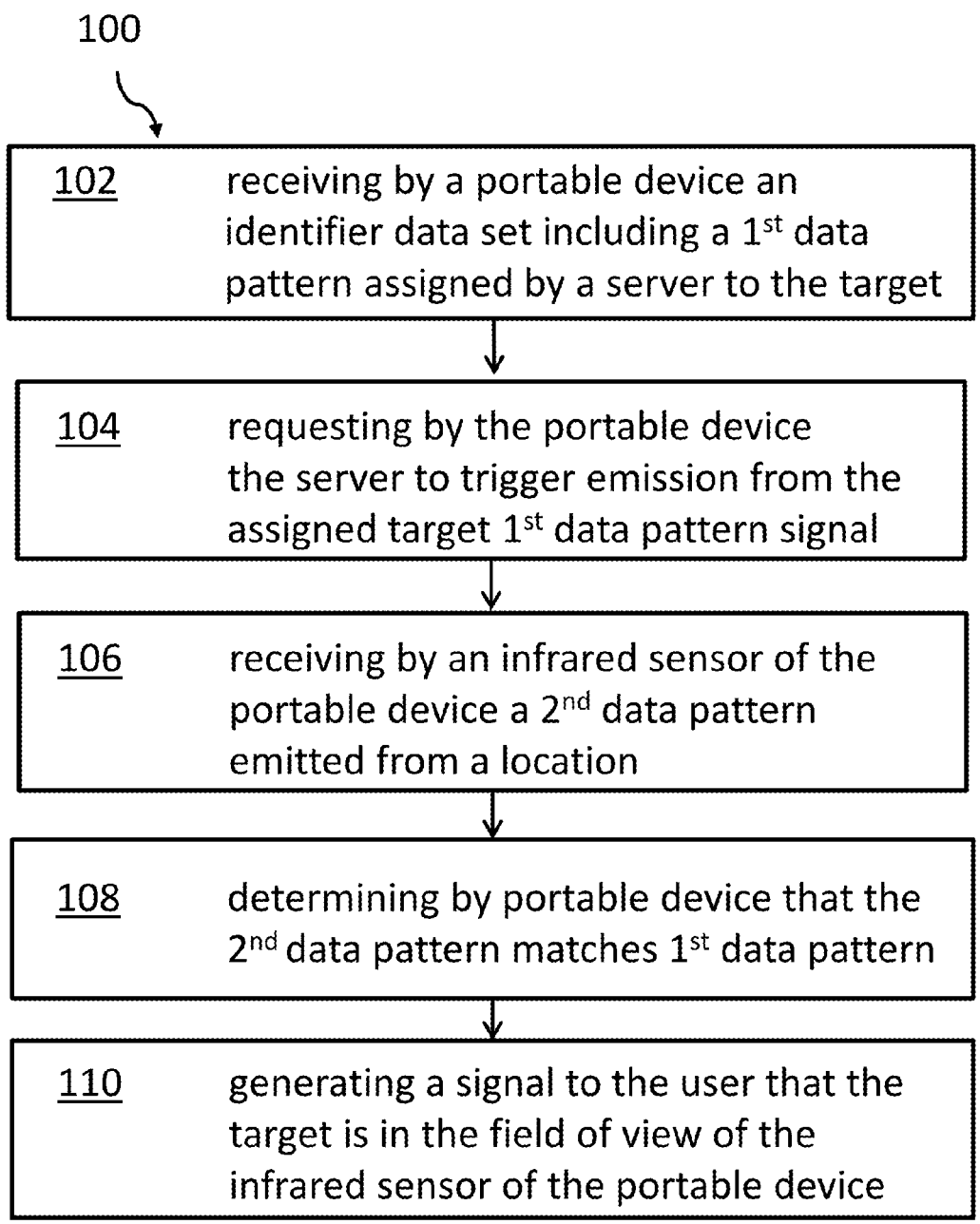

Preferred embodiments of the invention will be described, by way of example only, and with reference to the following drawings:

FIG. 1 shows a block diagram of an embodiment of the method of identifying a target location among a set of locations.

Figure 2:
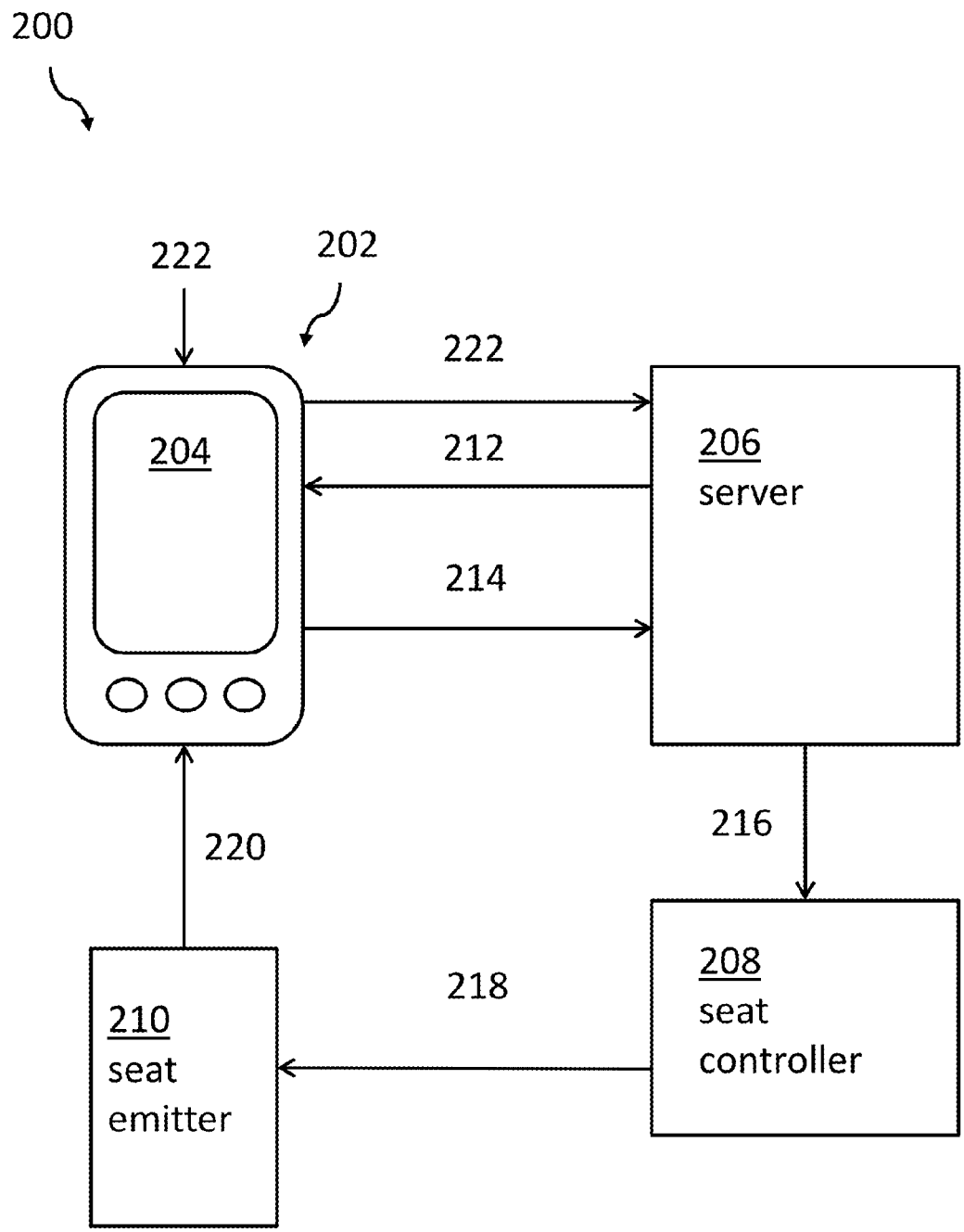

FIG. 2 shows a block diagram of the inventive concept and involved devices and their dependencies according to an embodiment of the present invention.

Figure 3:
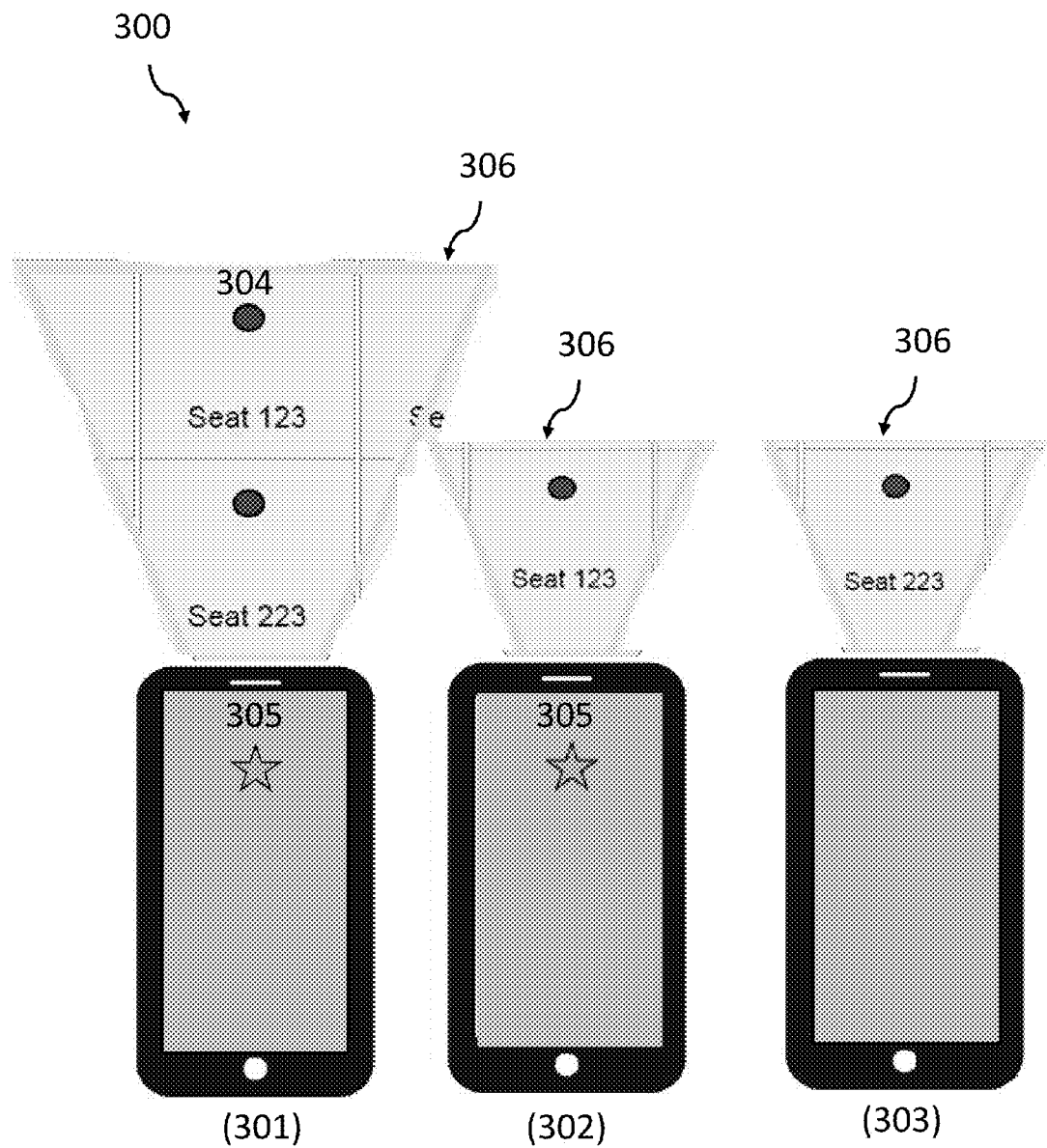

FIG. 3 shows a portable device and the display of a visual signal for the user of the portable device detecting the target according to a first embodiment of the invention.

Figure 4:
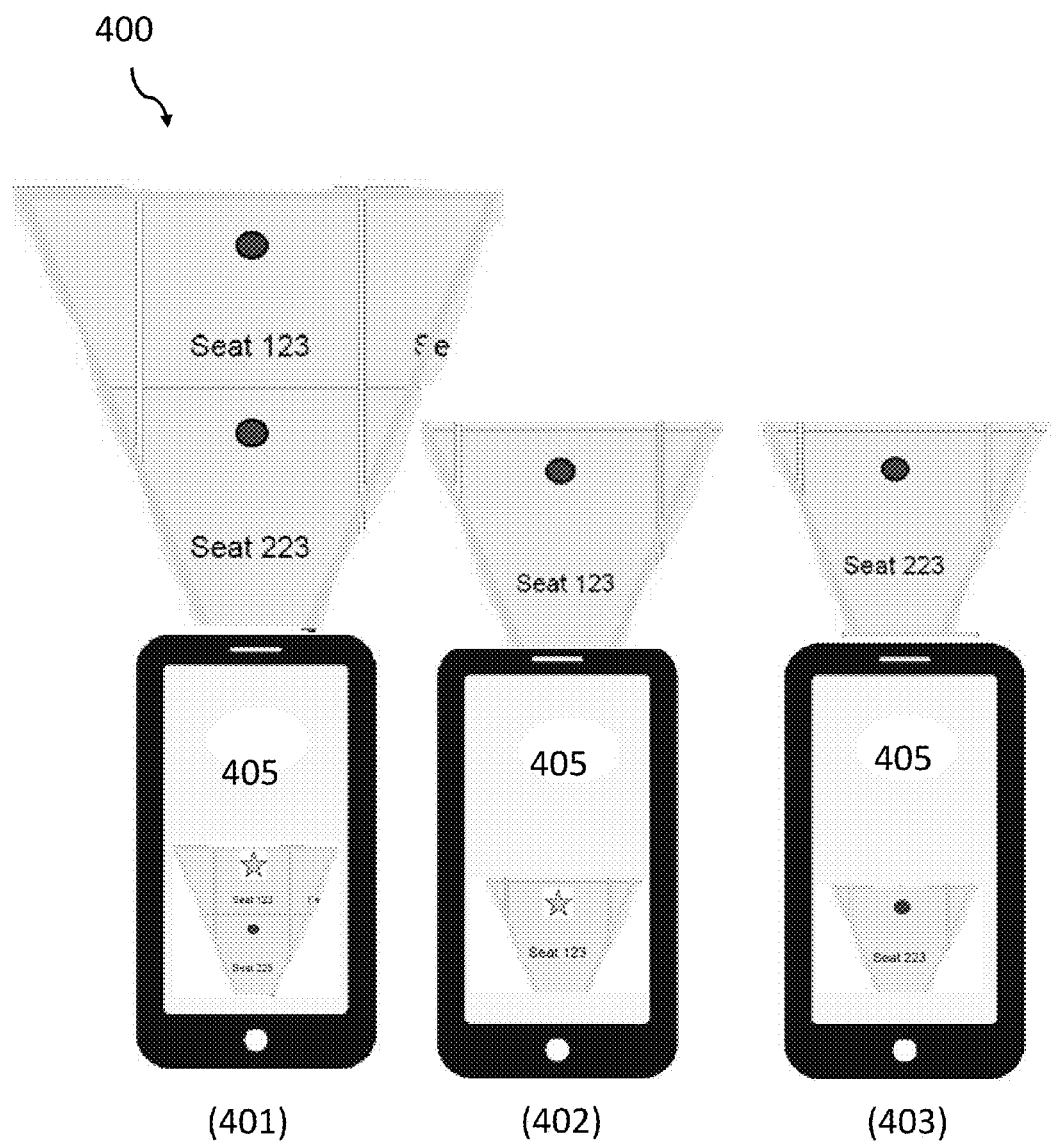

FIG. 4 shows a portable device with the display of the frames being captured by the camera and including a visual signal for the user of the portable device detecting the target according to a second embodiment of the invention.

Figure 5:
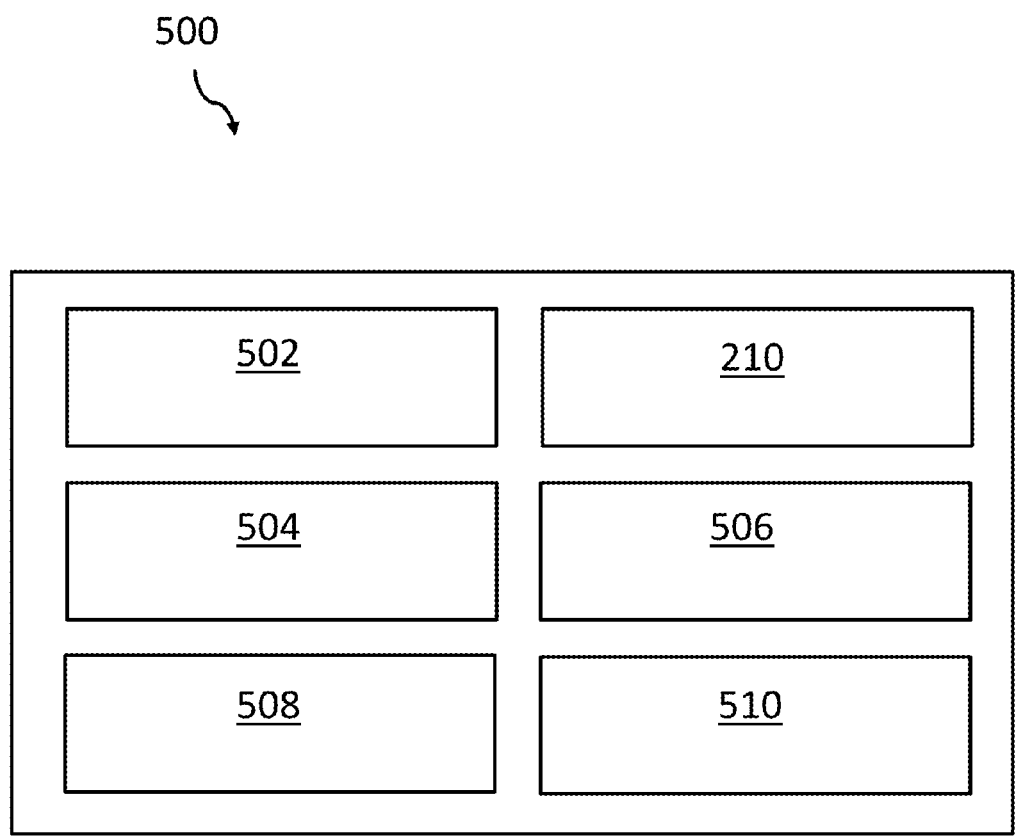

FIG. 5 shows a block diagram of a system implementing a method according to the present of the invention.

Figure 6:
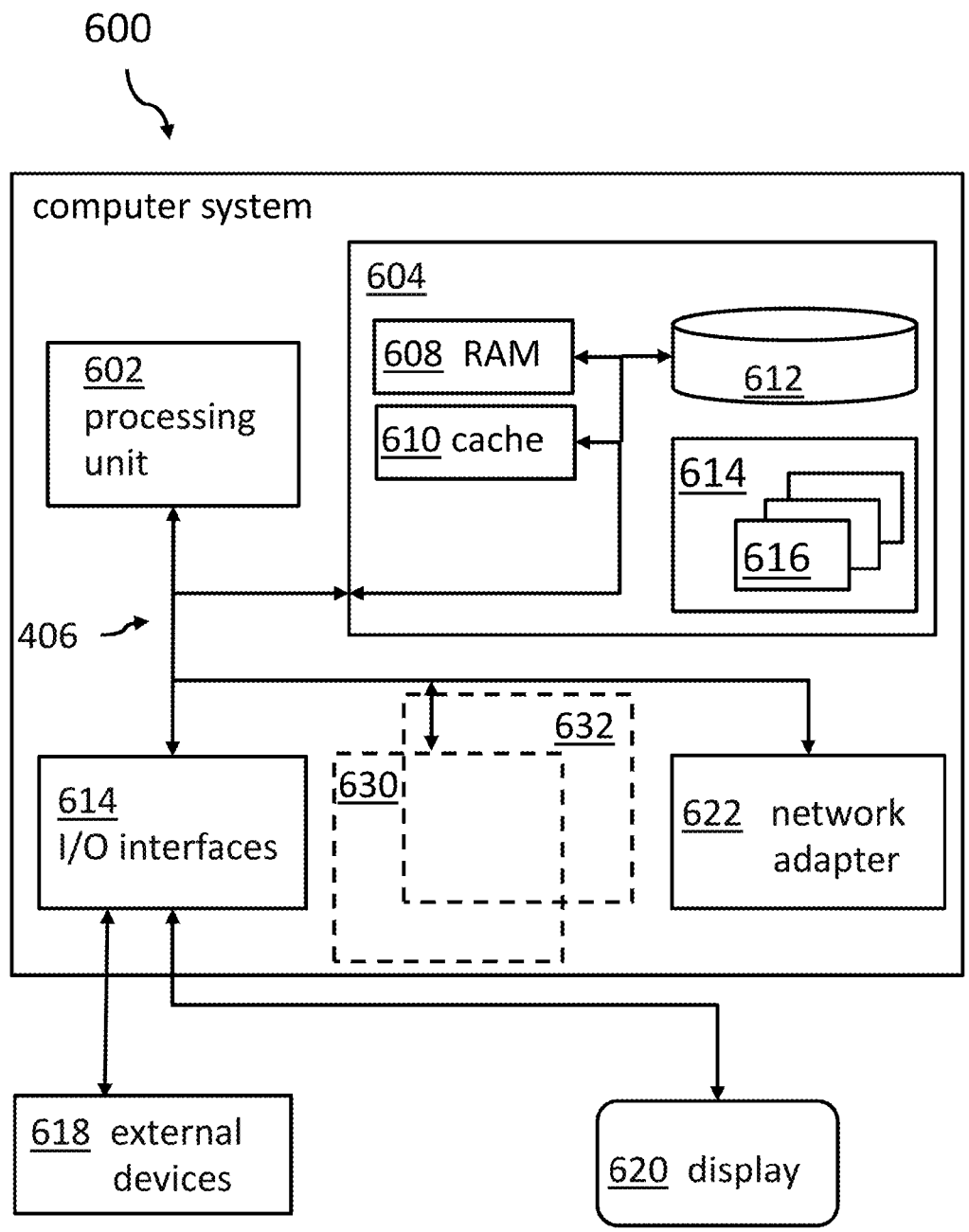

FIG. 6 shows a block diagram of an embodiment of a computer system usable as data a server to manage data pattern radiation signals of a target and/or to identify the data pattern radiation signals and to give directions to the target.

DETAILED DESCRIPTION

The invention relates generally to a method and a computer program product for identifying a target location, among a set of locations using a portable or mobile device, that then guides the user of the portable device to that target; more specifically, some embodiments of the invention relate to a method and computer program product for finding a seat in a large seating area of a theatre and for being guided to that seat using a smartphone. More particularly, in some embodiment the method can be practiced by a software application running on the user's smartphone that is connected wirelessly in data communication to a server. Some embodiments relate further to a computer implemented method and more particularly to a software application implemented on a server interfacing the portable device for finding a seat in a large seating area.

In the context of this description, the following conventions, terms and/or expressions may be used:

The term 'target' may denote a specific location (for example, a seat in a larger seating area, like a cinema, a conference hall, a theater and/or any other event room).

It may be difficult for a participant of event activities to discreetly find her reserved seat especially if the seating area is subject to dark, or dim, lighting conditions. For example, in some embodiments, the lights have been switched off or dimmed, and the aisles in the seating area have floor lights. In such an environment, finding a reserved seat is difficult. This may, in particular, happen in cases in which a visitor of an event being performed in such an environment comes from a light and bright environment. As a further example, the dark, or dim environment may be an open air concert with chairs. Each chair may be equipped with an infrared (IR) emitting device. IR light radiations are not usually visible by human eyes but can be detected and displayed in a viewfinder display by most of the cameras of the portable devices of today (for example, cameras built into smart phones).

Each seat can include an IR emitting device such as an IR LED which can emit an IR signal modulating a data pattern such as an IR blinking signal. This emitted signal may be received wirelessly. A seat controller may control the emitter for signal emission and may be battery powered. Other less expensive solutions exists for well-lit environments in which one could use a simple, large and brightly lit sign on the seat that user can directly see. The IR LED may be attached to the top of the seat for easy remote capture of the IR signal. Any other location of the IR LEDs signaling their relation to their dedicated seats can be used.

The term 'data pattern' may denote code, for example, an alpha-numeric code or any other code, encoded in binary form which may be generated by a computer, received and identified again at a later point in time by another device, such a portable device. It can be used to modulate an IR signal such as a blinking signal which is received through a camera built into a portable device, with a processor in the portable device using the modulation pattern to recognize the seat as the user's assigned seat (or a seat other than the user's assigned seat, as the case may be).

The term 'portable device' may denote a hardware system, a mobile device, a software controlled system, or a combination of hardware and software, for example, smartphone running a software application. The software application may receive on the portable device data, data sets, and data patterns from one data source such as a server. Other portable devices for use in the present invention are not necessarily limited to smartphone type devices. Any other device capable of receiving radiation from a radiation emitting device and making a display including a portion of the seating area where the device's camera is pointed maybe used in various embodiments of the present invention. This may also include a smart watch. Also, in a smart watch specific downloadable applications or apps may be downloaded to a user's device to help implement various embodiments of the present invention. The portable device may be equipped with wireless communication equipment to receive a modulation pattern associated with the user's assigned seat as well as IR sensitive detector.

Some embodiments of the present disclosure may offer a couple of advantages which will be discussed in the following paragraphs.

In some embodiments, at least two aspects are combined as will now be discussed. On the one hand side, a person arriving late at an event in a dim environment is guided to her reserved seat with the help of a dedicated device, in particular, a smartphone; and on the other side, participants having arrived on time following the event are only minimally impacted. A machine readable identification dataset including a combination of an electronic ticket or authentication to be used to enter the event location and a received first data pattern for identifying the reserved seat (target) of the latecomer may be transferred as a machine readable data set, in one step, from a reservation system (server) to a smartphone during the booking process for the event. The handling for the participant does not involve any additional step. No additional hardware may be required to guide the user up to the reserved seat. In some embodiments, the camera built into a user's smartphone may be used as an infrared sensor hardware set. If the onboard camera of the smartphone is not infrared sensitive, a small infrared sensing dongle may be connected to the smartphone. Because, in some embodiments, every target in the environment, for example, every seat, may be equipped with an infrared light source, for example, an IR-LED (infrared light emitting diode), the system may also enjoy the advantage of high availability. If one infrared light source fails, automatic guidance to the single seat may not be possible. However, a guiding function to all other seats may continue to work. If the seat with the failed infrared light source may also be taken, the infrared light source may no longer be required for a given event. Thus, the probability that an infrared light source fails in combination with the related seat being reserved for a latecomer will typically be comparably low.

The seat identifying function and the smartphone user guiding function to the seat may automatically be started when a ticketed user presents her ticket to enter the seating area. If the location is not well-lit, IR LEDs located on the seats are used to emit IR radiation. In some embodiments, the IR LED may emit a blinking signal, modulating a data pattern that serves to the seat and/or associate the seat with the seat's assigned user.

Preferably, the user of the portable device asks the server managing the IR radiation signals of the seats, to trigger the IR radiation signal of the reserved seat, modulated according to the data pattern dedicated to the seat, for a limited period of time. The other option is to have all the IR radiation signal switched on for all the seats by triggering of the IR controller by the server without any limit of time duration in advance, when the spectators are not yet entered. In this case at entry of the spectators, if all the IR LEDs blink a data pattern simultaneously, it may be difficult to clearly capture a specific blinking IR LED signal among two hundred of seats emitting each a different blinking pattern with the quality of IR sensor of the current portable devices. This is why the IR LEDs may start producing the blinking pattern only when the user asks for it from her portable device. This embodiment requires that the portable device, for instance the software application sunning on the portable device, need to contact the server managing the IR LEDs of the seating area, a software application running on the server itself interfacing for instance the portable device application. The wireless data communication connection between the server and the portable device can be through a wide area network (for example, the Internet).

It is noted that when the user of the portable device has moved in the seating area and is closer to her reserved seat, her smartphone with the high resolution camera that are included in the existing portable devices today can easily distinguish between two blinking lights coming from two seats in the field of view of the camera even if they are close.

It is also noted that a smartphone may require some time to "read" a blinking pattern. However, even if the smartphone is moving slightly, for instance when the user moves closer to her reserved seat, the smart phone may be able to track and identify the IR LED blinking data pattern of the reserved seat.

In some embodiments, the user's device will indicate: (i) that the radiation emitting device corresponding to the user's seat is present in the display of the camera's view finder (for example, in the smartphone touchscreen display); and/or (ii) the specific bright spot in a display of the camera's view finder that corresponds to the radiation emitting device that corresponds to the user's seat (for example, by overlaying a visual indication on the viewfinder display on the user's smartphone touchscreen). The visible signal can be more or less discreet depending on the brightness of the view finder display on the user's device. Alternatively, audio indication(s) may be used.

Once the blinking IR LED signal of her reserved seat has been identified and the signal is raised on her smartphone, the user is guided to her seat. The user may move to the direction corresponding to the field of view of the camera where the IR LED blinking signal has been identified to get closer to her reserved seat. At any closer location or when the user is moving closer to her reserved seat, the smartphone may repeat identification of IR LED signal of her reserved seat, and, in response to the identification of the radiation emitting device corresponding to the smartphone's user's seats, provide a visual indication of which bright spot in the smartphone display corresponds to the user's assigned seat. For example, this visual indication may include increasing the brightness of the bright spot caused by the appropriate radiation emitting device (for example, IR LED). While keeping the appropriate radiation emitting device in the view finder as the user is best able (note, the appropriate LED emitting device may be, at time, obscured by other persons or objects in the seating area). By continuing to keep the smartphone camera pointed in the direction of her seat, the user will effectively be guided to her seat because the radiation emitting device will be mechanically connected to the user's seat, or at least in proximity to the seat (for example, the radiation emitting device maybe mounted in the ceiling of an airline cabin directly over the user's assigned seat).

When the IR LED of the user seat is powered on by the server, it may not be immediately visible in the display on the user's smartphone for various reasons, such as the following: other people in the seating area may block the IR LED image; seats and/or other structures in the seating area may block the IR LED image; other LEDs that have been activated by other users may align with the LED image; and/or the user may not be pointing the camera in the correct direction to capture the IR LED in the boundaries of the image as shown on the smartphone screen. However, these difficulties can be overcome as the user walks to different positions in the seating area and adjusts where the smartphone camera is pointing. As the user moves her position, her smartphone camera's position and/or her smartphone camera's orientation, the correct IR LED will generally become (at least intermittently) visible in the image as shown on the smartphone camera touchscreen display. It is noted that if the IR LED emitters are located at the top of the seat, the floor of the theatre being not flat but higher at the bottom as it is often the case, when the user faces the seat area, the IR LED lights can be easily captured by the portable device IR sensor.

In the following, a detailed description of the figures will be given. All instructions in the figures are schematic. Firstly, a block diagram of an embodiment of the inventive method for identifying a target in the seating area is given. Afterwards, further embodiments as well as embodiments of the related identification system will be described.

FIG. 1 shows a block diagram of an embodiment of the method 100 for identifying a target, in particular a reserved space, for example, a seat, in a dim event space.

The portable device receives 102 an identifier machine readable data set which may be the result of a reservation made by the user of the portable device from her portable device. A server has already assigned to the user of the portable device for this reservation, a specific seat which may be assigned an identifier (for example, an identification number) that can be used to match the user to her assigned seat. In some embodiments, this identifier may take the form of a "first pattern." The same server or one other server has then assigned to the reserved seat a first data pattern which will be used by a software application of the portable device that the user has downloaded for instance from a website, to identify her seat and to guide her to it. Reception of the first data pattern may be performed at any place, in particular in or as part of a server instrumental for selling tickets and making seat reservations.

The first data pattern assigned by the server is specific to the reserved seat as it will allow to distinguish this reserved seat among other seats in the theatre. The identifier machine readable data set may comprise only the first data pattern or may be of any format and including the first data pattern: it may be entirely or partly, as a code of a purchased access ticket for an event, a conference pass, a cinema ticket, a theater ticket or any other authorization code granting access to a secured low lightened room. In one embodiment, the identifier machine readable data set may also be implemented as a paper ticket. The room may be a cinema, a theater and a concert hall, a conference hall, an area in an open air event happening at night and/or any other dark, or dim, environment having a seating which may be reserved for a particular visitor. Thus, the inventive concept may be applicable to a plurality of usage scenarios. Alternatively, the target may also be an exit door or the like.

The user who needs to identify her reserved seat in the theatre will from her portable device send a request to the server 104 asking it to trigger the first data pattern to be modulated into an infrared radiation signal by a IR light source, an IR signal emitter located on (at the top for instance) or close to her reserved seat (if this position close to the seat is also indicative of the seat). The server triggers a seat controller near to the seat IR emitter, which itself will start the IR emitter to emit the IR signal modulating the first data pattern. The server uses for communication with the seat controller a wireless connection such as a radio frequency connection (for example, a wireless router type connection, or a wireless phone network type connection) or, alternatively a visible light or IR light based connection. The server may have triggered more than one seat in the theatre this is why the portable device may receive modulated IR signals emitted from more than one seat in the theatre. The portable device equipped with an IR sensor receives 106 in the field of view of the IR sensor, a second data pattern from modulated IR signal emitted by a seat in the theatre. The portable device software application determines 108 if the second data pattern matches the first data pattern which has been received from the server to identify the reserved seat. If the first data pattern is identified by the portable device a signal is generated 110 by the software application of the portable device to advise the user that her reserved seat is in the field of view of the IR sensor. In this way, the user will know in which direction she has to move in the theatre while keeping the signal raised to reach her seat.

A smartphone may advantageously be used because it has data connection capabilities and may have pattern determination implemented, for example, as a software application. Additionally, the available camera system may be used as an infrared light detector. In some embodiments, no additional hardware system is required. Alternatively, the portable device may also be a dedicated seat finding device, a PDA (personal digital assistant), an augmented reality system implemented with smart glasses, etc. In some of these embodiments, the directions to find the seat may be displayed directly in the viewing field of the smart glass wearer. The method can be implemented in all these portable devices.

The method 100 may be implemented as target finding function of a software application on a portable device activated by the user when entering the dim environment. The target finding function may be activated automatically while entering the not highly lightened environment. Several options may be used to request the server system to activate the appropriate radiation emitting device, such as: by a received infrared signal, by a dedicated Wi-Fi signal, when the first data pattern is presented as an authentication code for entering the dim environment, and so on.

FIG. 2 shows a block diagram of an embodiment of a user device suitable for use in connection with the present invention The system 200 includes a portable device in form of a smartphone 202 having a display 204, a server 206 (the server generates the data patterns firstly sent to the portable devices 212 which can be used as ticket identifier or included in an identifier machine readable data set). The data patterns modulated into an IR signal are generated by a seat controller 208 triggered 216 by the server 206, the seat controller itself triggering 218 an IR light emitting device 210, for example, in IR LED. It may be ensured that the emitted IR light may be detectable from any place in the not highly lightened seat area and, in particular, from an entrance of the seat area.

The smartphone 202 may directly receive 212 the first data pattern included in a machine readable identification data set from the server 206 which may, or may not be, the ticket reservation server. Alternatively, the server acting as the ticket reservation server could only first provide a ticket number to the user on the web site for instance, the ticket number not including the first data pattern. In this case the smartphone user may enter, the ticket number into a smartphone 202 by typing the number—or alphanumeric code—all by using speech recognition. The ticket number is then sent 222 by the portable device to a server 206 which manages the seats IR LED radiations in the theatre. By return, the server 206 sends 212 the first data pattern included in a machine readable identification data set.

Alternatively, the server 206 may also be instrumental in a ticket purchasing and seat reservation process. In that case, the server 206 may generate the ticket number in the form of a machine readable identification data set including the first data pattern and sent it to the smartphone 202. The machine readable identification data set may entirely or partly be used as an authentication code for entering the dim area with a plurality of seats, one of which being reserved for the user of the smartphone.

The server 206 assigns a first data pattern to the user and sends the machine readable identification data set including the first data pattern to the smartphone; the server may also transmit 216 the first data pattern to the seat controller 208 one of which may be implemented for every seat in the seating area. The seat controller 208 may control, 218, an IR light emitting device 210, for example, in IR LED, such that the IR light emitting device may radiate IR light corresponding to the first data pattern.

Alternatively, each seat may have a predefined first data pattern stored in a permanent memory of each seat controller 208. In this case, the server may only activate a respective seat controller 208. A database and the server 206 may have stored a seat number or seat position together with a first data pattern to be transmitted, 214, to the smartphone 202, for example, by IR light.

In this embodiment, once the user of the smartphone 202 enters the seating area, a camera (not shown) in the smartphone 202 received (through communication path 220), the radiated first data pattern emitted from the IR light emitting device 210. In this embodiment, smartphone 202, supported by the respective application, received IR second data patterns to the first data pattern received from the server 206. Once a match between the two versions of the second data pattern is determined, the smartphone effectively identifies the reserved seat corresponding to her ticket.

At this point, the user will use a signal raised on her smartphone when her seat is in the field of view of the camera to move to the direction of her seat. FIGS. 3 and 4 illustrate a portable device and the display of a visual signal for the user of the portable device detecting the target. Some embodiments of the invention use radiation emitting devices that emit electromagnetic radiation at wavelength(s) outside of the visible portion of the electromagnetic spectrum to avoid disturbing other spectators in the seating area. In some embodiments, IR radiation is used because these wavelengths are invisible to the human eye. This is the case also for the indication made by the portable device to advise the user that her seat is in the field of view of the IR sensor or the camera. In FIG. 3, the field of view of the camera 306 of a smartphone includes seats (Seat 223, Seat 123) which could be both empty and IR lights switched on (red disks 304). The signal 305 (in this embodiment, a visual indication) is made which is an object, for instance a star superposed anywhere on the screen meaning in 301 that the smartphone has identified that the first data pattern is modulated by the IR signal of one of the two seats. It is noted that the screen of the smartphone will typically remain quite dark and even if the visual indication caused by signal 305 is visible by the user, the entire screen is not bright, and, therefore, does not disturb the other spectators. In 302 the user has come closer to Seat 123 which is now in the field of view 306 of the camera: as the signal 305 is raised for Seat 123, this means that the IR LED sends the right signal and Seat 123 is the seat reserved for the user. If the user orients her camera towards the other seat, Seat 223, the signal 305 is not made meaning that Seat 223 is not the seat reserved for the user.

FIG. 4 shows a portable device, the display of the frames captured by the camera including a visual signal for the user of the portable device detecting the target according to an embodiment of the invention. Similarly to FIG. 3, FIG. 4 illustrates the same situation where the user is close to her seat and first captures in 401 in the field of view of the camera two seats, Seat 123 and Seat 223. The difference with FIG. 3 is that the image displayed on the screen of the smartphone is different, brighter because, for instance, the theatre is particularly dark. The screen displays the entire 2D image 405 captured by the camera of the smartphone. The software application of the smartphone computes the location of the IR lights in the 2D image 405 captured by the camera and superposes an object that could be a star in the location of the reserved seat, Seat 123 on the image displayed on the screen. In such a way, the user can easily see which seat is the reserved one. In the same way, the application could superpose one different object, such as a triangle not represented in FIG. 4, on the IR light of Seat 223 which is not the reserved seat, in image 401 displayed on the screen of the smartphone 403. If the user focuses on Seat 123 the signal is raised with an object superposed on the IR light of Seat 123 the on the image of the 2D view on the screen of smartphone in 402. If the user focusses on Seat 223, the signal is not made on the image of the 2D view of Seat 223 in 403.

FIG. 5 shows a block diagram of an embodiment of the inventive system 500. In this embodiment, system 500 includes assignment unit 502 adapted for assigning a first data pattern to a target location corresponding to a seat reserved by a user, first receiver 504 adapted for receiving by a portable device the first data pattern included in a machine readable identification data set related to the target, and infrared light source, 210, located at the target, the infrared light source being adapted for radiating the first data pattern. Moreover, identification system 500 include infrared light sensible detector 506—or a camera used as the IR light sensitive detector—adapted for receiving a second data pattern by the portable device, determination unit 508 adapted for determining that a received second data pattern corresponds to the assigned first data pattern, and signal generation unit 510 adapted for helping the user to find direction to move to the target in the dim environment.

FIG. 6 shows a block diagram of an embodiment of a computer system usable as server to trigger generation of IR LED signal modulating a first data pattern or portable device identifying the IR LED signal modulating a first data pattern and providing direction to the user to move to the target.

Embodiments of the invention may be implemented together with virtually any type of computer, regardless of the platform being suitable for storing and/or executing program code. FIG. 6 shows, as an example, computing system 600 suitable for executing program code related to the proposed method, for example, a smartphone, a smartwatch, a dedicated seat finding device, and/or a server. The smartphone may run a smartphone application, in other words, an app, whereas the server may run an application for generating and assigning the machine readable identification data set and the first data pattern.

Computing system 600 is only one example of a suitable computer system and is not intended to suggest any limitation as to the scope of use or functionality of embodiments of the invention described herein. Regardless, computer system 600 is capable of being implemented and/or performing any of the functionality set forth hereinabove. In computer system 600, there are components, which are operational with numerous other general purpose or special purpose computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 600 is shown in the form of a general-purpose computing device. The components of computer system/server 600 may include, but are not limited to, one or more processors or processing units 602, system memory 604, and bus 606 that couples various system components, including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and no limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

System memory 604 may include computer system readable media in the form of volatile memory, such as random access memory (RAM) 608 and/or cache memory 610. Computer system/server 600 may further include other removable/non-removable, volatile/non-volatile computer system storage media. By way of example only, storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (for example, a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, memory 604 may include at least one program product having a set (for example, at least one) of program modules that are configured to carry out the functions of embodiments of the invention.

Program/utility 614, having a set (at least one) of program modules 616, may be stored in memory 604 by way of example, and no limitation, as well as an operating system, one or more application programs, other program modules, and program data. Each of the operating system, one or more application programs, other program modules, and program data or some combination thereof, may include an implementation of a networking environment. Program modules 616 generally carry out the functions and/or methodologies of embodiments of the invention, as described herein.

Computer system/server 600 may also communicate with one or more external devices 618 such as a keyboard, a pointing device, display 620, etc.; one or more devices that enable a user to interact with computer system/server 600; and/or any devices (for example, network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (for example, the Internet) via network adapter 622. As depicted, network adapter 622 may communicate with the other components of computer system/server 600 via bus 606. It should be understood that although not shown, other hardware and/or software components could be used in conjunction with computer system/server 600. Examples, include, but are not limited to: microcode, device drivers, redundant processing units, external disk drive arrays, RAID systems, tape drives, and data archival storage systems, etc.

Additionally, identifying the pattern matching device 630 and/or the data pattern generator 632 may be attached to the bus system 606. Both options are shown as dashed lines. A skilled person will understand that this may actually represent two different systems.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

A couple of possible variations will now be discussed. In some embodiments, the "radiation emitting device" may emit visible light instead of infrared radiation. However, in these embodiments, a designer should take care that the radiation-related characteristics of the radiation emitting devices (for example, brightness intensity) and/or the expected context of the seating area will not render the visible light radiation distracting, or annoying, to people in the seating area. Also, previous embodiments have modulated identification patterns into the radiation by turning the radiation emitting device on and off to form a binary pattern. However, modulation may be accomplished in other ways. For example, the identification pattern could be the wavelength of the radiation itself, with each seat in the seating area having a corresponding radiation emitting device structured and/or program to emit at a unique wavelength, or pattern of wavelengths as emission continues over time. Of course, these embodiments would require the end users' radiation sensing devices (for example, smartphone cameras) to be able to determine received wavelength.

As another variation, some embodiments may activate more than one radiation emitting device to guide the user to the seat. For example, all of the radiation emitting devices of a user's row may flash for a few seconds prior to activating, in a more sustained manner, only the radiation emitting device corresponding to the user's seat. Similarly, radiation devices from a column, or other "line," including user's seat may be activated (at least for a limited time) to help the end user converge her attention, and the cone of vision of her smart phone camera, on the radiation emitting device corresponding to her exact seat. These variations can be useful when the seating area is full of people, who may be temporarily blocking the end user's line of sight to the radiation emitting device corresponding to her seat.

The communications between an end user's device (for example, smart phone) and the server computer that controls activation of the radiation emitting device corresponding to the end user's seat may be over a local area network (LAN) or a wide area network (WAN). In some embodiments, the location of the end user's device (for example, location as determined by Global Positioning System functionality) may be communicated from the end user's device to the seating area server system. In some embodiments, a location of the user's seat (for example, location as expressed in GPS co-ordinates), and/or other seat mapping information, may be communicated from the seating server system to the end user's device.

According to an aspect of the present invention, a method includes the following operations: receiving, from a server by a portable device, a machine readable identification data set including a first data pattern, assigned by the server to a target among a set of locations; sending to the server by the portable device, a request, including the machine readable identification data set, to trigger emission by the target of the first data pattern modulated into an infrared radiation signal for a limited period of time; receiving by the portable device, using an enabled infrared sensor hardware set connected within or with the portable device, a second data pattern modulated into an infrared radiation signal emitted by a location triggered also by the server; determining by the portable device that the received second data pattern modulated into an infrared radiation signal matches the first data pattern; and generating by the portable device, a signal to advise the user of the portable device that the target has been identified in the field of view of the infrared sensor hardware set.

The method of the previous paragraph may include one, or more of the following additional operations, characteristics and/or features: repeating by the portable device, upon changing, by the user of the portable device, the position and the direction of the field of view of the portable device infrared sensor hardware set, the receiving, determining and generating steps until the target has been identified; assigning by the server, the user of the portable device to a target among the set of targets; sending by the server to the portable device a machine readable identification data set including a first data pattern; the server deciding at any time and independently of any request by the portable device, to trigger the target to emit the first data pattern modulated into an infrared radiation; the first or second data pattern is modulated into an infrared radiation signal emitted by a location infrared emitter turned on and off at intervals corresponding to the first data pattern; sending by the server, a request to a controller of the target infrared emitter to trigger the emitter for emitting the first data pattern modulated into an infrared radiation signal; the infrared sensor hardware set is in the form of a camera built into the portable device; displaying by the portable device, on the screen of the portable device, the frames captured by the enabled camera, the displayed frames including infrared lights corresponding to infrared radiations emitted by locations in the field of view of the camera; the operation of generating a signal on the portable device includes computing by the portable device, the coordinates of the displayed infrared lights in the frames captured by the camera and superposing on the screen of the portable device, a first visual object indicative of the target, on the corresponding displayed infrared light; determining by the portable device that the received second data pattern does not match the first data pattern; and/or computing by the portable device, the coordinates of the displayed infrared lights in the frames captured by the camera and superposing on the screen of the portable device, a second visual object indicative of one location infrared light which is not the target, on the corresponding displayed infrared light.

According to an aspect of the present invention, a computer program product includes: a computer readable storage hardware: and machine executable program instructions stored on the computer readable storage hardware. The machine executable program instructions include: first program instructions programmed to receive, from a server, a machine readable identification data set including a first data pattern, assigned by the server to a target among a set of locations; second program instructions programmed to send, to the server, a request, including the machine readable identification data set, to trigger emission by the target of the first data pattern modulated into an infrared radiation signal for a limited period of time; third program instructions programmed to receive, using an enabled infrared sensor hardware set connected within or with the portable device, a second data pattern modulated into an infrared radiation signal emitted by a location triggered also by the server; fourth program instructions programmed to determine that the received second data pattern modulated into an infrared radiation signal matches the first data pattern; and fifth program instructions programmed to generate a signal to advise the user of the portable device that the target has been identified in the field of view of the infrared sensor hardware set.

The computer program product of the previous paragraph may include one, or more of the following additional program instructions, characteristics and/or features: program instructions programmed to repeat, upon changing, by the user of the portable device, the position and the direction of the field of view of the portable device infrared sensor hardware set, the receiving, determining and generating steps until the target has been identified; the first or second data pattern is modulated into an infrared radiation signal emitted by a location infrared emitter turned on and off at intervals corresponding to the first data pattern; the infrared sensor hardware set is in the form of a camera built into the portable device; program instructions programmed to display on the screen of the portable device, the frames captured by the enabled camera, the displayed frames including infrared lights corresponding to infrared radiations emitted by locations in the field of view of the camera; the fifth program instructions (see previous paragraph) further include program instructions programmed to compute the coordinates of the displayed infrared lights in the frames captured by the camera and superposing on the screen of the portable device, a first visual object indicative of the target, on the corresponding displayed infrared light; program instructions programmed to determine that the received second data pattern does not match the first data pattern; and/or program instructions programmed to compute the coordinates of the displayed infrared lights in the frames captured by the camera and superposing on the screen of the portable device, a second visual object indicative of one infrared light which is not the target, on the corresponding displayed infrared light.

According to an aspect of the present invention, a computer implemented method includes the following operations (not necessarily in the following order): assigning the user of the portable device to a target among the set of targets; sending by the server to the portable device a machine readable identification data set including a first data pattern.

The method of the previous paragraph may include one, or more of the following additional operations, characteristics and/or features: deciding at any time and independently of any request by the portable device, to trigger the target to emit the first data pattern modulated into an infrared radiation; and/or sending a request to a controller of the target infrared emitter to trigger the emitter for emitting the first data pattern modulated into an infrared radiation signal.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage to a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other devices to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method comprising:
   providing a seating area with a plurality of seats including a first seat, and a plurality of radiation emitting devices respectively corresponding to the plurality of seats, the plurality of radiation emitting devices including a first radiation emitting device corresponding to the first seat;
   receiving, by a server over a communications network and from first user through a first portable wireless device, a request to activate the first radiation emitting device;
   responsive to the request, activating, by the server, the first radiation emitting device; and
   responsive to passage of a predetermined interval after the activation of the first radiation emitting device, deactivating the first radiation emitting device;
   wherein the plurality of radiation emitting devices are structured and/or programmed to emit infrared radiation.

2. The method of claim 1 wherein each radiation emitting device of the plurality of radiation emitting devices is mechanically connected to the respectively corresponding seat of the plurality of seats.

3. The method of claim 1 further comprising:
   assigning, by the server, a machine readable identifier to the first user and also to the first seat;
   wherein the request received from the first user includes the machine readable identifier.

4. The method of claim 3 further comprising:
   assigning, by the server, a modulation pattern to the machine readable identifier;
   wherein the activation of the first radiation emitting device activates the first radiation emitting device so that the first radiation emitting device emits modulated radiation according to the modulation pattern.

5. The method of claim 4 wherein the modulation pattern modulates an on/off status of the first radiation emitting device during the interval that the first radiation emitting device is activated.

6. The method of claim 1 wherein the communication network is a wireless local area network.

7. A system for use with a plurality of portable wireless devices and a seating area including a plurality of seats, with each seat of the plurality of seats being respectively assigned to a user of a plurality of users and with the plurality of wireless devices being respectively operated by at least some of the users of the plurality of users, the system comprising:
   a server computer; and
   a plurality of radiation emitting devices respectively located to respectively correspond to the plurality of seats;
   wherein:
   each of the plurality of radiation devices is structured to be in data communication with the server computer so that the server computer selectively controls emission of radiation by the plurality of radiation emitting devices;
   the server computer is structured and programmed to receive, through a wireless communication network, requests from the plurality of portable wireless devices;
   the server computer is further structured and programmed to, responsive to a request from a portable wireless device of the plurality of portable wireless devices, activate a radiation emitting device, of the plurality of radiation emitting devices, that corresponds to the seat corresponding to the portable wireless device corresponding to the user making the request; and
   the server computer is further structured and programmed to, responsive to passage of a predetermined interval after the activation of a radiation emitting device, deactivate that radiation emitting device;
   the plurality of radiation emitting devices are structured and/or programmed to emit infrared radiation.

8. The system of claim 7 wherein each radiation emitting device of the plurality of radiation emitting devices is mechanically connected to the respectively corresponding seat of the plurality of seats.

9. The system of claim 7 wherein:
   the server computer is further structured and programmed to assign a plurality of machine readable identifiers, with each machine readable identifier respectively corresponding to a seat, of the plurality of seats, and also to the user assigned to that seat;
   the server computer is further structured and/or programmed to communicate, to each portable wireless device, of the plurality of portable wireless devices, the machine readable identifier, of the plurality of machine readable identifiers, that corresponds to the user that operates the portable wireless device; and
   each request received, by the server from a user, includes the machine readable identifier corresponding to the user who sent the request.

10. The system of claim 9 wherein:
the server computer is further structured and/or programmed to assign a modulation pattern to each machine readable identifier of the plurality of machine readable identifiers; and
the server computer is further structured and programmed to control an activated radiation emitting device to emit radiation in a manner that is modulated according to the modulation pattern corresponding to the machine readable identifier corresponding the seat corresponding the activated radiation emitting device.

11. The system of claim 10 wherein each modulation pattern modulates an on/off status of the corresponding activated radiation emitting device.

12. The system of claim 7 further comprising:
a wireless local area network (LAN); wherein
the wireless LAN is structured and programmed to transmit communications between the plurality of portable wireless devices and the server computer; and
the wireless LAN is further structured and programmed to transmit communications between the plurality of radiation emitting devices and the server computer.

13. A method for use with a seating area with a plurality of seats including a first seat, and a plurality of radiation emitting devices respectively corresponding to the plurality of seats, the plurality of radiation emitting devices including a first radiation emitting device corresponding to the first seat, the method comprising:
receiving, from a server and by a first portable wireless device including a camera and a display that displays images generated by the camera, a first machine readable identifier that correlates a first user associated with the first portable wireless device to the first seat of the plurality of seats;
sending, to the server over a communications network and by a first user through a first portable wireless device, a request including the first machine readable identifier to cause the server to activate the radiation emitting device for a limited interval; and
responsive to pointing the camera in a direction of the first seat during the limited interval, generating a series of time ordered images of a portion of the seating area on the display of the first portable wireless device, with at least some of the time ordered series of images showing the first radiation emitting device.

14. The method of claim 13 wherein:
the plurality of radiation emitting devices are structured and/or programmed to emit infrared radiation; and
the camera of the first portable wireless device is structured and programmed to show infrared radiation features in displays generated for the display of the first portable wireless device.

15. The method of claim 14 further comprising:
receiving, from the server and by the first portable wireless device, a modulation pattern to the machine readable identifier, with the modulation pattern being a pattern of modulation emitted by the first radiation emitting device under control of the server during the interval of activation of the first radiation emitting device;
detecting, by machine logic of the first wireless portable device, the modulation pattern in the series of images; and
overlaying a visual indication of the location first radiation emitting device in at least one image of the series of images.

16. The method of claim 15 wherein the modulation pattern modulates an on/off status of the first radiation emitting device during the interval that the first radiation emitting device is activated.

17. The method of claim 13 wherein the communication network is a wireless local area network.

* * * * *